United States Patent [19]

Jambhekar et al.

[11] Patent Number: 5,742,894
[45] Date of Patent: *Apr. 21, 1998

[54] RADIO COMMUNICATION DEVICE HAVING A MOVEABLE HOUSING ELEMENT AND KEYPAD DISPOSED THEREIN

[75] Inventors: Shiriang Jambhekar, Schaumburg; Daniel L. Williams, Vernon Hills; Albert Leo Nagele, Wilmette, all of Ill.

[73] Assignee: Motorola, Inc., Schaumburg, Ill.

[*] Notice: The term of this patent shall not extend beyond the expiration date of Pat. No. 5,584,054.

[21] Appl. No.: 421,273

[22] Filed: Apr. 13, 1995

Related U.S. Application Data

[63] Continuation-in-part of Ser. No. 384,182, Feb. 6, 1995, Pat. No. 5,584,054.

[51] Int. Cl.⁶ ................................................. H04B 1/38
[52] U.S. Cl. ................................ 455/90; 455/90; 455/550; 379/433
[58] Field of Search ......................... 455/90, 89, 550, 455/556, 566, 575; 379/433, 428, 434

[56] References Cited

U.S. PATENT DOCUMENTS

| | | | |
|---|---|---|---|
| 4,653,086 | 3/1987 | Laube | 379/96 |
| 5,146,615 | 9/1992 | Hodsdon et al. | 455/90 |
| 5,175,759 | 12/1992 | Metroka et al. | 379/58 |
| 5,283,862 | 2/1994 | Lund | 395/155 |
| 5,327,584 | 7/1994 | Adachi et al. | 455/89 |
| 5,337,346 | 8/1994 | Uchikura | 379/58 |
| 5,369,788 | 11/1994 | Nagai | 455/90 |
| 5,422,656 | 6/1995 | Allard et al. | 345/173 |
| 5,584,054 | 12/1996 | Tyneski et al. | 455/89 |

FOREIGN PATENT DOCUMENTS

0472361A2  2/1992  European Pat. Off.

OTHER PUBLICATIONS

U.S. pending patent application, Serial No. 08/276,374, filed by Motorola, Inc.
Simon™ Mobile Communications Made Simple brochure, from BellSouth Cellular Corp., 1994.

Primary Examiner—Reinhard J. Eisenzopf
Assistant Examiner—Darnell R. Armstrong
Attorney, Agent, or Firm—Kirk W. Dailey; John J. Oskorep

[57] ABSTRACT

A radio communication device (103) operable in a radio communication system (100) providing a plurality of radio communication services including radiotelephone, facsimile and electronic mail services. The radio communication device (103) has a body housing element (107) and moveable housing element (109). When the moveable housing element (109) is in the closed position, the moveable housing element (109) covers a portion of a touch screen display (119). A keypad (125) is integrated into the moveable housing element (109) and operable when the moveable housing element (109) is in the closed position. When a user depresses a key of the keypad (125) a portion of the key provides pressure against the touch screen display (119). The provided pressure activates a portion of the touch screen display (119).

25 Claims, 5 Drawing Sheets

103

RADIO COMMUNICATION DEVICE HAVING A MOVEABLE HOUSING ELEMENT AND KEYPAD DISPOSED THEREIN

This is a continuation-in-part of application Ser. No. 08/384,182, filed Feb. 6, 1995 now U.S. Pat. No. 5,584,054.

FIELD OF THE INVENTION

Generally, the present invention relates to radio communication devices and more specifically to a radio communication device having a moveable housing element and a keypad disposed therein for operating the radio communication device.

BACKGROUND OF THE INVENTION

Today, radio communication devices provide radio communication services such as two-way radio service, radiotelephone service, cellular phone service, cordless phone service and wireless data communication services such as wireless fax, electronic mail (e-mail), and short message service. These services are generally packaged individually into a single radio communication service device, such as a traditional radiotelephone. By packaging these radio communication services as individual devices, a manufacturer can offer a portable or hand held radio communication device that is relatively easy to use. However, there is increasing pressure in the marketplace to provide a multi-functional radio communication devise that offers more than one of the typical radio communication services mentioned above. Attempting to combine such radio communication services into a single radio communication device creates a cumbersome user interface that is undesired by potential customers. A typical user interface includes a speaker, a microphone, a display and a data input device such as a keypad. For some radio communication services a small display and a small data input area is required. For example, in a portable radiotelephone often there is a small display and a fixed data input keypad. On the other hand, a wireless data service such as e-mail requires extensive display of received messages as well as extensive user data input from either a pen or a keyboard.

If a manufacturer was to provide an integrated product that combined a radiotelephone and an e-mail service, the simpler user interface of the radiotelephone service would be lost in the complex user interface required for an e-mail service. Thus, it would be advantageous to provide an integrated data communication device wherein a user could easily identify the user interface of a first data service from a user interface of a second data service.

DETAILED DESCRIPTION OF A PREFERRED EMBODIMENT

An embodiment of the present invention encompasses a radio communication device having a body housing element and a moveable housing element coupled thereto. The moveable housing element is moveable between an open or extended position and a closed position. The radio communication device includes a touch screen display disposed in the body housing element and a keypad disposed in the moveable housing element. When the moveable housing element is in the closed position, the moveable housing element covers a portion of the touch screen display. Additionally, the radio communication device has a first set of user functions operable by the keypad. The first set of user functions includes limited radiotelephone functions such as phone number input and sending and receiving phone calls. The keypad is shaped to form a plurality of keys. The keys have a first portion exposed through corresponding apertures in the moveable housing element, such that when a user depresses the first portion of the keys a second portion of the key provides pressure against the touch screen display. The provided pressure activates a portion of the touch screen display. When the moveable housing element is in the open or extended position, the radio communication device has a second set of user functions which include radiotelephone functions, advanced radiotelephone functions, and messaging functions. The messaging functions include electronic mail, faxing, and short message service.

Figure 1:
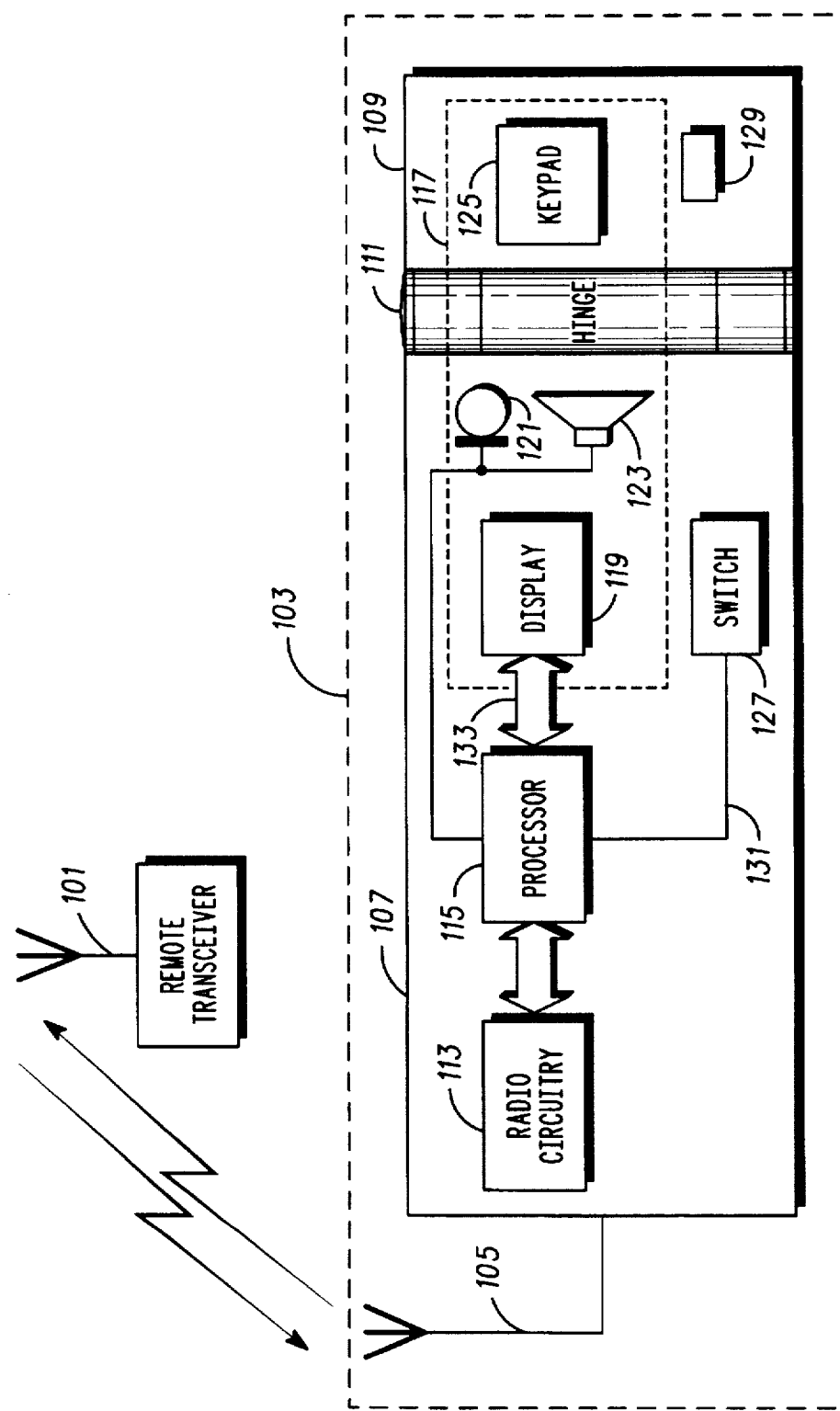
FIG. 1 is an illustration in blocked diagram form of a radio communication system in accordance with the present invention.

FIG. 1 is an illustration in blocked diagram form of a radio communication system 100. The radio communication system 100 includes a remote transceiver 101. In the radio communication system 100 the remote transceiver 101 sends and receives radio frequency (RF) signals to and from multiple radio communication devices within a fixed geographic area. The radio communication device 103 is one such radio communication device contained within the geographic area served by the remote transceiver 101. The RF signals transmitted between the remote transceiver 101 and the radio communication device 103 provide radio communication services such as radiotelephone service, electronic mail service, wireless fax service and short message service. Other equally sufficient embodiments of the present invention may include other combinations of these communication services and other radio communication services.

The radio communication device 103 includes an antenna 105, a body housing element 107, a moveable housing element 109, and a hinge 111 for coupling the moveable housing element 109 to the body housing element 107. In the preferred embodiment, the body housing element 107 includes radio circuitry 113, a processor 115, and a portion of a user interface 117. The user interface 117 includes a display 119, a microphone 121, a speaker 123, and a keypad 125. The display 119, the microphone 121, and the speaker 123 are disposed within the body housing element 107. The keypad 125 is disposed within the moveable housing element 109 in the preferred embodiment. Additionally, the radio communication device 103 includes a switch 127 disposed within the body housing element 107 and a switch activation device 129 disposed within the moveable housing element 109. It is anticipated that other equally sufficient embodiments of the present invention would include a radio communication device that equally disposed components between a body housing element and a moveable housing. Such an embodiment would dispose at least a portion of the radio circuitry within the body housing element.

Upon reception of RF signals, the radio communication device 103 receives the RF signals through the antenna 105. The antenna 105 converts the received RF signals into electrical RF signals for use by the radio circuitry 113. The radio circuitry 113 demodulates the electrical RF signals and recovers the data transmitted using the RF signals. Additionally, the radio circuitry 113 outputs the data to the processor 115. The processor 115 includes at least a main microprocessor such as an MC68040 available from Motorola, Inc., and associated memory as well as other control circuits including integrated circuits or other known technologies. The processor 115 formats the data output from the radio circuitry 113 into a recognizable voice or messaging information for use by the user interface 117. The user interface 117 communicates the received information or voice to a user through the use of the speaker 123 and the display 119.

Upon transmission of RF signals from the radio communication device 103 to the remote transceiver 101, the user interface 117 transmits user input data to the processor 115. Such data may include voice data and/or messaging information. The processor 115 formats the information obtained from the user interface 117 and transmits the formatted information to the radio circuitry 113. The radio circuitry 113 converts the formatted information into electrical RF modulated signals to the antenna 105 for transmission back to the remote transceiver 101.

Figure 2:
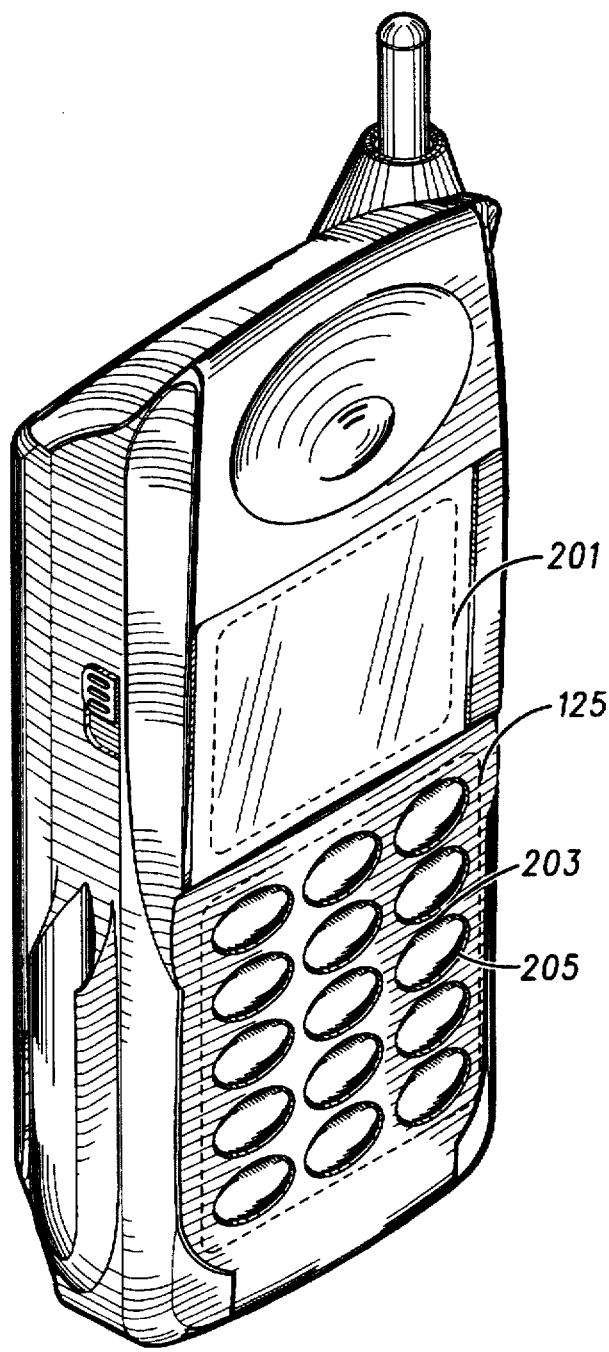
FIG. 2 is a detailed illustration of a radio communication device in a closed position in accordance with the present invention.
Figure 4:
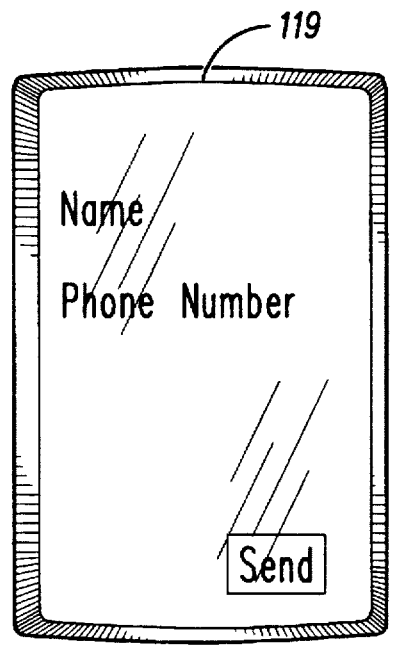
FIG. 4 is an illustration of a display in the portrait mode in accordance with the-present invention.

In the preferred embodiment, the moveable housing element 109 has a first position and second position, also referred to as an open position and a closed position. FIG. 2 is a detailed illustration of the radio communication device 103 of FIG. 1 in the closed position. When the moveable housing element 109 is in the closed position, it covers a portion of the touch screen display 119 and the radio communication device 103 has a limited first set of user functions available. The limited set of user functions include only radiotelephone functions such as inputting telephone numbers, initiating and ending telephone calls and recalling phone numbers from a memory. This limited set of user functions is related to the functions available on a low tier radiotelephone available today. In the closed position a portion of the touch screen display 119 is exposed to the user. This exposed portion contains a data display area 201 for displaying radiotelephone feedback such as a telephone number, a signal strength, a battery level, and roaming information. The information displayed in the data display area is oriented vertically, hereinafter referred to as a portrait mode, as illustrated in FIG. 4.

In the preferred embodiment, the moveable housing element 109 includes a keypad 125. The keypad 125 includes a plurality of individual keys including a limited number of function keys and a number pad containing individual keys numbered 0–9. Each individual key is disposed within the moveable housing element 109. Each key has a first portion of the key exposed on a first side of the moveable housing element 109 and a second portion of the key is exposed on a second side of the moveable housing element 109. The keys are arranged such that when the moveable housing element 109 is in the closed position, the plurality of keys are arranged adjacent to a user data area (not shown) of the touch screen display 119. The user data area of the touch screen display 119 is covered by the moveable housing element 109 and is divided up into multiple user data sub-areas which correspond to the plurality of keys of the keypad 125. When the first portion of a first key is depressed by a user, the second portion of the first key provides a pressure against the touch screen display and activates a corresponding user data sub-area. This activation of the particular user data sub-area of the touch screen display 119 creates a corresponding signal that is sent back to the processor 115 to interpret the meaning of the activation. This signal is sent via the display bus 133.

Figure 3:
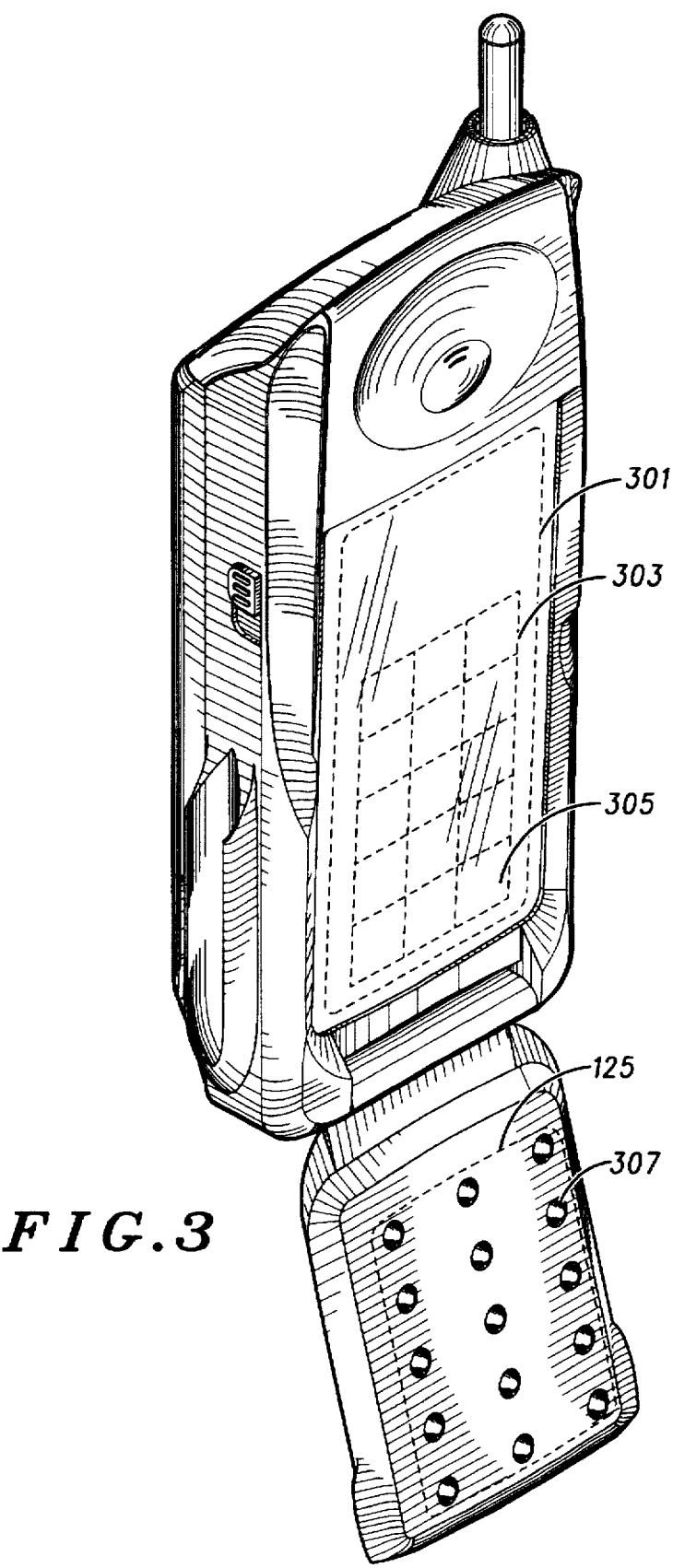
FIG. 3 is a detailed illustration of a radio communication device in accordance with the present invention.

FIG. 3 is a detailed illustration of the radio communication device 103 of FIG. 1 in the opened position. As the moveable housing element 109 is moved to the open or extended position the switch activation device 129 in conjunction with the switch 127 creates a mode change signal 131 that is sent to the processor 115, as illustrated in FIG. 1. The mode change signal 131 indicates to the processor 115 that the moveable housing element 109 is being opened and a second set of user functions becomes available to the user. In the preferred embodiment, the second set of user functions includes advanced radiotelephone control functions and messaging functions such as wireless faxing, electronic mail and short messaging service.

Figure 5:
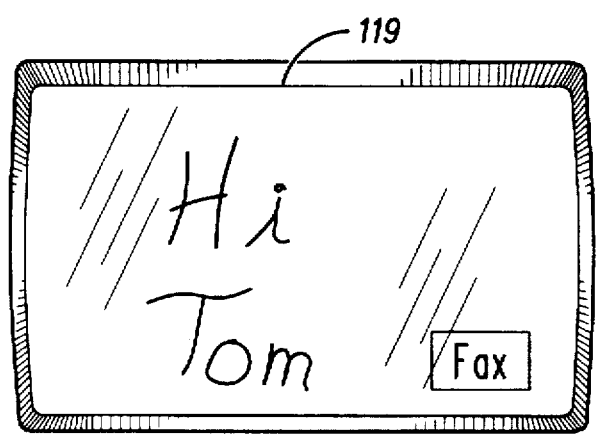
FIG. 5 is an illustration of a display in the landscape mode in accordance with the present invention.

With the moveable housing element 109 in the open or extended position, the radio communication device 103 has a second set of user functions. This second set of user functions includes advanced radiotelephone control functions and messaging functions. The advanced radiotelephone functions include a menu for storing and recalling telephone numbers as well as programming the user's preferences for controlling the radiotelephone. All of the radiotelephone control functions, including the advanced and the limited radiotelephone control functions, are displayed in a radiotelephone display configuration. This configuration includes orienting the display in the portrait mode as discussed above and illustrated in FIG. 4. All of the messaging functions including electronic mail, faxing and short message service are displayed in a messaging display configuration. This configuration includes orienting the display in the horizontal direction, hereinafter referred to as the landscape mode, as illustrated in FIG. 5. Additionally, when the moveable housing element 109 is in the opened position, the display arrangement for the touch screen display 119 is reconfigured. This reconfiguration includes increasing the data display area 301 to include the entire touch screen display 119 and it also changes the number of user data sub-areas 305 in the user data area 303. In the preferred embodiment the data display area 301 and the user data area 303 overlap each other when the moveable housing element 109 is in the extended or opened position.

Additionally, the radio communication device 103 performs additional functions responsive to the moveable housing element 109. Specifically, as the moveable housing element 109 moves from the closed position to the opened position, the radio communication device 103 can perform an off-hook function. As the moveable housing element 109 moves from the opened position to the closed position, the radio communication device 103 can perform an on-hook function. Furthermore, any other predetermined radio communication device control function can be performed in response to moving the moveable housing element between the first position and the second position.

Alternatively, the first set of user functions may include exclusively radiotelephone control functions and the second set of user functions may include exclusively messaging functions. In this alternative embodiment, when the moveable housing element 109 is in the closed position, the radio communication device 103 functions only as a radiotelephone. When the moveable housing element 109 is in the open or extended position, the radio communication device 103 operates solely as a messaging communication system. Consequently, the touch screen display would be oriented in the portrait mode while the flip is closed and in response to moving the moveable housing element 109 to the open position, the touch screen display 119 would be reconfigured to the landscape mode, as illustrated in FIG. 4.

In the detailed illustration of the portable radio communication device 103 in FIG. 2 and FIG. 3, the moveable housing element 109 is a flip. It is anticipated that other equally sufficient embodiments of a moveable housing element 109 may be substituted therefor. These other embodiments include: a clam shell type housing element, a swivel type housing element and a sliding type housing element.

Figure 6:
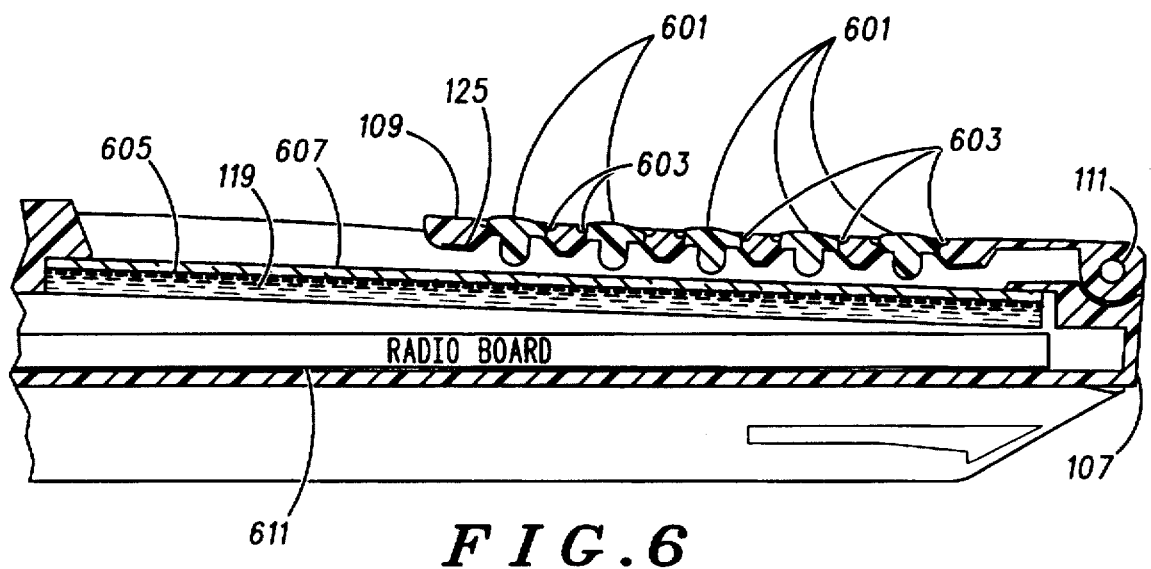
FIG. 6 is an illustration of a cross-sectional view of the radio communication device of FIG. 2 in accordance with the present invention.

FIG. 6 is an illustration of a cross-sectional view of the radio communication device 103 of FIG. 2. Specifically, FIG. 6 illustrates the moveable housing element 109 in the closed position, the hinge 111 coupling the moveable housing element 109 to the body housing element 107. Here, the body housing element 107 includes a radio board 611 and a display 119. The radio board 611 the radio circuitry 113 and the processor 115 of FIG. 1. The display 119 is disposed in the body housing element 107 in a manner such that a first portion of the display 119 is exposed on a first side of the body housing element 107. In the preferred embodiment, the display 119 is a touch screen display. The touch screen display 119 includes a traditional display apparatus 605 for displaying display data for the radio communication device and a resistive film 607 for indicating to the processor 115 when the touch screen display 119 has been activated.

In the preferred embodiment, the keypad 125 is made of a single piece of plastic webbed material. The single piece of plastic webbed material is shaped to form a plurality of keys 601 of the keypad 125. It is anticipated that other materials including: plastic, silicon, rubber etc. could be used to provide a suitable material for the keypad 125. The moveable housing element 109 includes a plurality of apertures 603 corresponding to the plurality of keys 601. The plurality of apertures allow a first portion of the plurality of keys to be exposed on an outer side of the moveable housing element 109. The keypad 125 is coupled to an underside of the moveable housing element 109. In the preferred embodiment, the keypad is coupled to the moveable housing element 109 using a sonic weld, however, other couplers may be used such as mechanical couplers or adhesive couplers.

Figure 7:
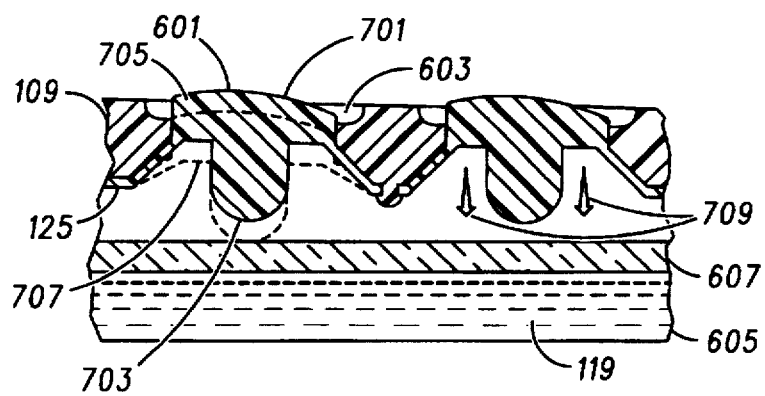
FIG. 7 is a detailed illustration of a portion of the cross-sectional view of FIG. 6.

The keypad 125 is operative when the moveable housing element 109 is in the closed position. FIG. 7 is an exploded view of the moveable housing element 109, the keypad 125 and the touch screen display 119 of FIG. 6. In the preferred embodiment, when the moveable housing element 109 is in the closed position, the plurality of keys 601 of the keypad 125 are adjacent to the display 119. A first portion 701 of the plurality of keys is exposed on a first side of the moveable housing element 109 through the apertures 603. A second portion 703 of the plurality of keys is exposed on a second side of the moveable housing element 109. The keypad operates as follows: First, the first key of the keypad is at rest in a first position 705 substantially flush with the first side of the moveable housing element 109; second, a user depresses the first portion of the first key of the keypad 125 exposed on the first side of the moveable housing element; third, responsive to the depression the first key moves to a second position 707 indicated by the dashed lines of FIG. 7; and fourth, a pressure, indicated by the arrows 709 of FIG. 7, is applied to the resistive film 607 of the display 119, thereby activating the display 119.

What is claimed is:

1. A portable communication device, comprising:
   a body housing element defining a front surface, a left side, a right side, a top end, and a bottom end, the front surface positioned in between the left and the right sides, the left and the right sides distanced to fit within a hand of a user;
   a moveable housing element having a first surface and a second surface, said moveable housing element rotatably coupled to the bottom end of said body housing element and moveable between an open position and a closed position;
   a speaker disposed in said body housing element and outwardly directed from the front surface of said body housing element, said speaker providing audio for telephone communication when said moveable housing element is in the closed position;
   a touch screen display outwardly directed from the front surface of said body housing element and positioned below said speaker, said touch screen display partially covered when said moveable housing element is in the closed position and fully exposed when said moveable housing element is in the open position, said touch screen display providing a plurality of contact areas for activation;
   a keypad including a plurality of telephone keys carried on said moveable housing element, each of the plurality of telephone keys having a first portion outwardly exposed on the first surface of said moveable housing element and viewable when said moveable housing element is in the closed position; and
   an antenna carried on said body housing element and outwardly extending from the top end thereof.

2. The portable communication device according to claim 1, wherein at least one telephone key of said plurality of telephone keys has a second portion exposed on the second surface of said moveable housing element, the second portion of said at least one key touching, when actuated, a first portion of said touch screen display when said moveable housing element is in the closed position, thereby activating the first portion of said touch screen display.

3. The portable communication device according to claim 2, wherein said keypad is made of a single piece of plastic webbed material, said single piece of plastic webbed material being shaped to form said plurality of telephone keys, and wherein said keypad is integrated into said moveable housing element.

4. The portable communication device according to claim 3, wherein said moveable housing element includes a plurality of apertures corresponding to said plurality of telephone keys, said plurality of apertures exposing the first portion of said plurality of telephone keys on the first surface of said moveable housing element.

5. The portable communication device according to claim 3, wherein said keypad is coupled to the second surface of the moveable housing element using a coupler selected from the group consisting of mechanical, adhesive, and sonic weld.

6. A radio communication device having radio circuitry operative in a radio communication system, the radio communication device comprising:
   a body housing element having at least a portion of said radio circuitry disposed therein;
   a touch screen display for entering input data and displaying output data, said touch screen display disposed within said body housing element;
   a moveable housing element having a first surface and a second surface, the second surface facing opposite the first surface, said moveable housing element coupled to said body housing element and moveable between at least an open position and a closed position, such that when said moveable housing element is in the closed position, a first portion of said touch screen display is outwardly exposed and a second portion of said touch screen display is covered by said movable housing element; and a keypad having at least a first key carried on said moveable housing element, said at least first key having a first portion exposed on the first surface of said moveable housing element, said at least first key configured to extend for contact with said touch screen display upon actuation when said moveable housing element is in the closed position.

7. The radio communication device according to claim 6, wherein a second portion of said at least first key provides a pressure against said touch screen display in response to the first portion of said at least first key being depressed.

8. The radio communication device according to claim 7, wherein said touch screen display further comprises:

a display data area and a user data area, the user data area being positioned adjacent and parallel to the second portion of said at least first key when said moveable housing element is in the closed position.

9. The radio communication device according to claim 8, further comprising:

a plurality of keys contained in said keypad, each of said plurality of keys having a first portion and a second portion; and a plurality of user data sub-areas in the user data area of said touch screen display, each of said plurality of user data sub-areas corresponding to one of said plurality of keys, such that when each first portion of said plurality of keys is depressed, a corresponding second portion makes physical contact with and thereby activates a corresponding user data sub-area.

10. The radio communication device according to claim 8, further comprising:

at least two display arrangements for arranging, in response to movement of said moveable housing element, the display data area and the user data area, the at least two display arrangements including a first arrangement where the user data area includes a plurality of user data sub-areas for touch activation when said moveable housing element is in the open position.

11. A radio communication device according to claim 8, wherein the input data includes input data relating to telephone functions including phone numbers when said moveable housing element is in the closed position, and wherein the input data includes input data relating to messaging functions including at least one of facsimile, electronic mail, and short-messaging service functions when said moveable housing element is in the open position.

12. The radio communication device according to claim 6, wherein said keypad is made of a single piece of plastic webbed material, said single piece of plastic webbed material being shaped to form said at least first key, and wherein said keypad is coupled to the second surface of said moveable housing element.

13. The radio communication device according to claim 12, wherein said moveable housing element includes at least a first aperture corresponding to said at least first key, said at least first aperture exposing the first portion of said at least first key on the first surface of said moveable housing element.

14. The radio communication device according to claim 13, wherein said keypad is coupled to the second surface of said moveable housing element using a coupler selected from a group consisting of mechanical, adhesive, and sonic weld.

15. The portable communication device according to claim 1, wherein said touch screen display is sized to fit over more than half of the front surface of said body housing element.

16. The portable communication device according to claim 1, wherein said touch screen display is sized to fit over about two-thirds of the front surface of said body housing element.

17. The portable communication device according to claim 15, wherein said moveable housing element is sized to cover more than half of said touch screen display.

18. The portable communication device according to claim 16, wherein said moveable housing element is sized to cover more than half of said touch screen display.

19. The portable communication device according to claim 1, further comprising:

a processor disposed in said body housing element, said processor coupled to said touch screen display, said processor to provide limited radio communication functions for said portable communication device in response to said moveable element being positioned in the closed position, said processor to provide advanced radio communication functions for said portable communication device in response to said moveable element being positioned in the open position, the limited radio communication functions including telephone communication functions associated with use of said plurality of telephone keys, the advanced radio communication functions including at least one of facsimile, electronic mail, and short-messaging service functions associated with use of said touch screen display.

20. A portable radiotelephone, comprising:

a first housing element, said first housing element defining a top end, a bottom end, a left side, a right side, and a viewing surface, the viewing surface positioned in between the left and the right sides, the left and the right sides distanced to fit within a hand of user;

a second housing element, said second housing element movably coupled to the bottom end of said first housing element and providing an open position and a closed position for said portable radiotelephone;

a speaker, said speaker disposed in said first housing element and outwardly directed from the viewing surface of said first housing element, said speaker providing audio for telephone communication when said portable radiotelephone is in the closed position;

a touch screen display, said touch screen display outwardly directed from the viewing surface of said first housing element and positioned below said speaker, said touch screen display having a display surface sized to fit over more than one-half of the viewing surface of said first housing element, said display surface being fully exposed when said portable radiotelephone is in the open position, said display surface being partially exposed and more than one-half covered when said portable radiotelephone is in the closed position, said touch screen display providing a plurality of contact areas for activation; and a keypad including a plurality of telephone keys, said keypad carried on said second housing element, said plurality of telephone keys provided for initiating telephone communication.

21. The portable radiotelephone according to claim 20, wherein said display surface is sized to fit over about one-third of the viewing surface of said first housing element.

22. The portable radiotelephone according to claim 20, wherein each of said plurality of telephone keys includes a first portion outwardly exposed on said second housing element when said portable radiotelephone is in the closed position.

23. The portable radiotelephone according to claim 20, wherein said second housing portion defines a first surface and a second surface, said plurality of telephone keys includes a first key having a first portion exposed on said first surface and a second portion exposed on said second surface, and wherein said second portion is configured to make contact with said display surface upon depression of said first portion when said portable radiotelephone is in the closed position.

24. A portable electronic device, comprising:
a housing, including:
a first housing element;
a second housing element coupled to said first housing element, said first and said second housing elements providing an open position and a closed position for said portable electronic device;
a touch screen display, said touch screen display outwardly directed from said first housing element, said touch screen display having a display surface fully exposed when said portable electronic device is in the open position, said display surface only partially exposed when said portable electronic device is in the closed position;
a keypad including a plurality of telephone keys, said keypad carried on said second housing element and exposed when said portable electronic device is in the closed position;
electrical circuitry disposed in said housing, said electrical circuitry including:
radio circuitry;
a switch, said switch responsive to the open and closed positions of said portable electronic device; and
a processor, said processor coupled to said switch and to said touch screen display, said processor to provide advanced radio communication functions in response to said portable electronic device being positioned in the open position, said processor to control said touch screen display to display the advanced radio communication functions in response to said portable electronic device being positioned in the open position, the advanced radio communication functions including at least one of electronic mailing functions, facsimile functions, and short messaging functions, said processor to provide limited radio communication functions in response to said portable electronic device being positioned in the closed position, the limited radio communication functions including telephone functions associated with use of said plurality of telephone keys.

25. The portable communication device according to claim 24, wherein said second housing element defines a first surface and a second surface, wherein each key of said plurality of telephone keys includes a first portion exposed on the first surface and a second portion exposed on the second surface, and wherein said second portion is configured to extend for contact with said touch screen display upon depression of said first portion when said portable communication device is in the closed position.

* * * * *